Jan. 8, 1963 B. A. KAUFMAN 3,072,895
VOLTAGE LIMIT COMPARATOR
Filed Aug. 13, 1958
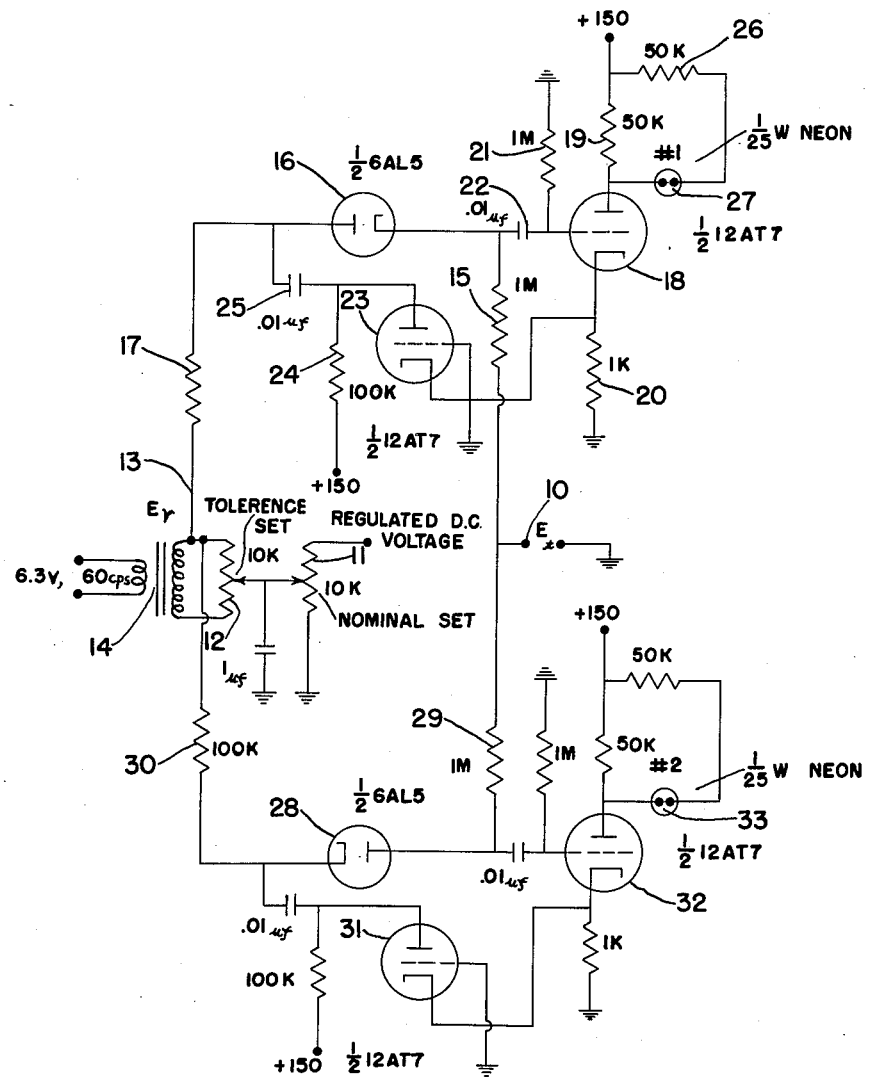
INVENTOR.
BRUCE A. KAUFMAN
BY
W. E. Thibodeau, A. J. Dupont & H. R. Johns

United States Patent Office 3,072,895
Patented Jan. 8, 1963

---

3,072,895
VOLTAGE LIMIT COMPARATOR
Bruce A. Kaufman, Los Angeles, Calif.
(325 Fowling St., Playa Del Rey, Calif.)
Filed Aug. 13, 1958, Ser. No. 754,903
3 Claims. (Cl. 340—248)
(Granted under Title 35, U.S. Code (1952), sec. 266)

The invention described herein may be manufactured and used by or for the Government for governmental purposes without the payment of any royalty thereon.

This invention relates to means for testing a voltage against a standard and more especially to a device for continuously indicating the relation to within preset tolerances between a standard voltage and a tested voltage.

This device is constructed of readily available parts and functions continuously to provide a first indication when the tested voltage is within a predetermined range of values, to provide a second indication when the tested voltage is above this range, and to provide a third indication when the voltage falls below this range. As will appear, it consists of a pair of circuits so interconnected that they both function when the tested voltage is within its tolerance range and one or the other of the circuits functions when the tested voltage is outside its tolerance range.

The invention will be better understood from the following description when considered in connection with the accompanying drawing and its scope is indicated by the appended claims.

The single FIGURE of the drawing illustrates a preferred form of the invention wherein a unidirectional voltage to be tested is applied to a terminal 10, a "standard plus tolerance" voltage composed of a unidirectional voltage developed at the slider of potentiometer 11, and an alternating voltage having peak-to-peak excursions commensurate with the tolerable variation in the value of tested voltage, developed across the upper half of potentiometer 12, is applied to terminal 13.

Connected between the terminals 10 and 13 are a resistor 15, a diode 16 and a resistor 17. A triode 18 has its anode connected to a +B terminal through a resistor 19, its cathode connected to ground through a resistor 20 and its grid connected to ground through a resistor 21 and coupled through a capacitor 22 to the cathode of the diode 16. A second triode 23 has its grid connected to ground, its cathode connected to the cathode of the triode 18 and its anode connected to a +B volt terminal through a resistor 24 and coupled through a capacitor 25 to the anode of the diode 16.

With these connections, the voltage to be tested is applied through the resistor 15 to the cathode of the diode 16, and the "standard plus tolerance" voltage is applied through the resistor 17 to the anode of this diode.

It may be seen that, except for the diode 16, tubes 18 and 23 are connected in a positive feedback circuit, that is, one that is inherently unstable and will produce oscillations. To those familiar with the art this will be recognized as a form of cathode coupled multivibrator. The diode 16 serves to keep the feedback loop open when it is not conducting, i.e., the anode voltage is less than the cathode voltage, and thus prevent oscillations. When the anode voltage equals or exceeds the cathode voltage the diode conducts allowing oscillations to occur. These are manifested by large excursions of voltage across the plate resistor 19 (as well as elsewhere), and are sufficient to fire the neon indicator lamp 27, indicating the occurance of oscillations and hence the fact that the diode has been caused to conduct.

In a companion circuit a diode 28 has its anode connected to the terminal 10 through a resistor 29 and its cathode connected to the terminal 13 through a resistor 30. This diode is reversed with respect to the diode 16 and is otherwise interconnected with triodes 31 and 32 and indicator 33 in the same way that the diode 16 is interconnected with the triodes 18 and 23 and the indicator 27. The operation of this part of the circuit is the same as that previously described with the exception that pulses are applied to the indicator 33.

The operation of the device may be understood by considering typical conditions of operation. Let it be desired to measure a given voltage which should fall to within ±10% of 100 volts. Thus potentiometer 11 would be set to provide 100 unidirectional volts, and potentiometer 12 would be set to provide 20 peak-to-peak alternating volts across its upper half. If, for example, the voltage applied to terminal 10 is 115 volts it may be seen, that since the maximum instantaneous anode voltage diode 16 can ever attain is 110 volts that this diode will always have its anode voltage less than its cathode voltage and thus never conduct. Thus indicator 27 will never light. On the other hand, diode 28 will find a maximum instantaneous voltage of 110 volts on its cathode, hence this diode will always conduct, and indicator lamp 33 will always be lit.

Consider, now, that the voltage applied to 10 is 100 volts. Thus whenever the alternating component of the voltage applied to the anode of 16 would swing above 100 volts this diode would conduct, allowing an indication on 27. When the alternating component of the voltage applied to the cathode of 28 swings below 100 volts this diode will conduct allowing an indication on 33. Thus for a different part of each alternating cycle both lamps are lit.

For a third consideration, let the voltage applied to 10 be 85 volts. The lowest instantaneous voltage applied to the anode of 16 is 90 volts, hence 16 will always conduct and allow an indication on 27. The lowest voltage applied to the cathode of 28 is also 90 volts, and therefore the cathode will always be higher in voltage than the anode, and 28 will never conduct, and 33 will never light.

These actions may be summarized as follows:

| $E_x$ | 27 lit | 33 lit |
|---|---|---|
| $E_x > 110$ | No | Yes |
| $90 \leq E_x 1 \leq 10$ | Yes | Yes |
| $E_x < 90$ | Yes | No |

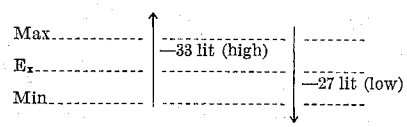

These may be further generalized to the statement that when the voltage applied to 10 is above the set tolerance only indicator 33 is lit. Thus 33 may be called the "high" indicator. When the voltage applied to 10 is within tolerance range both indicators 27 and 33 are lit, and when the voltage applied at 10 is below the tolerance range only indicator 27 is lit. This may be called the "low" indicator.

Clearly, visual indication is only one possible mode of operation. The same pulses which fire the indicating lights can be used, with suitable additional circuitry, to actuate other indicating or selecting mechanisms, such as relays, sorting bins, card and tape punches, printers, etc.

The comparator may be applied to test any quantity that may, by suitable transducers, be converted into a proportionate voltage. Thus one may measure current, frequency, fluid flow, gas pressure, weight, speed, acidity and alkalinity, etc, It may also be seen that, although the circuit illustrated utilizes vacuum tubes, the devices is equally workable with semi-conductor components, transistors and semi-conductor diodes, for example.

I claim:

1. A voltage limit comparator including a pair of terminals for applying a voltage to be tested, a pair of terminals for applying a voltage which is the sum of a standard voltage and an alternating voltage having peak-to-peak excursions commensurate with a predetermined tolerance range, a pair of diodes reversely connected between said pairs of terminals, a pair of cathode coupled multivibrators each having a feedback circuit including a different one of said diodes and each operable to produce oscillations only when the diode in its feedback circuit is conducting, and means for indicating the conductive conditions of said multivibrators.

2. A voltage limit comparator including first and second diodes, a first pair of terminals for applying a voltage to be tested to the cathode of said first diode and to the anode of said second diode, a second pair of terminals for applying to the anode of said first diode and to the cathode of said second diode a voltage which is the sum of a standard unidirectional voltage and an alternating voltage having peak-to-peak excursions commensurate with the tolerance variations in said tested voltage, a first means having a feedback circuit including said first diode and operable to produce oscillations only when said first diode is conducting, a second means having a feedback circuit including said second diode and operable to produce oscillations only when said second diode is conducting and means for indicating the existence of said oscillations.

3. A voltage limit comparator according to claim 2 wherein means are provided for varying the magnitudes of said standard and alternating voltages.

References Cited in the file of this patent
UNITED STATES PATENTS

| | | |
|---|---|---|
| 2,658,167 | Harris | Nov. 3, 1953 |
| 2,683,226 | Kerpchar | July 6, 1954 |
| 2,714,634 | Hall | Aug. 2, 1955 |
| 2,822,535 | Fields | Feb. 4, 1958 |